United States Patent
Spanjers et al.

(12)

(10) Patent No.: US 10,150,332 B2
(45) Date of Patent: Dec. 11, 2018

(54) SPOKE COMPOSED OF BRAIDED FIBER WITH HUB AND RIM TERMINATIONS

(71) Applicant: BERD, L.L.C., Roseville, MN (US)

(72) Inventors: Charles S. Spanjers, St. Paul, MN (US); Kyle D. Olson, Roseville, MN (US)

(73) Assignee: BERD L.L.C., Roseville, MN (US)

( * ) Notice: Subject to any disclaimer, the term of this patent is extended or adjusted under 35 U.S.C. 154(b) by 118 days.

(21) Appl. No.: 15/147,357

(22) Filed: May 5, 2016

(65) Prior Publication Data

US 2016/0332481 A1 Nov. 17, 2016

Related U.S. Application Data

(60) Provisional application No. 62/160,124, filed on May 12, 2015, provisional application No. 62/278,527, filed on Jan. 14, 2016.

(51) Int. Cl.
*B60B 1/00* (2006.01)
*B60B 5/02* (2006.01)
*B60B 1/02* (2006.01)

(52) U.S. Cl.
CPC .............. *B60B 1/003* (2013.01); *B60B 5/02* (2013.01); *B60B 1/0246* (2013.01); *B60B 1/0269* (2013.01); *B60B 2360/322* (2013.01); *B60B 2360/36* (2013.01); *B60B 2900/111* (2013.01); *B60B 2900/351* (2013.01)

(58) Field of Classification Search
CPC .......... B60B 2360/36; B60B 2360/322; B60B 2900/351; B60B 1/003; B60B 5/02; B60B 1/0269; B60B 1/0246; B60B 2900/111

USPC .............. 301/55, 58, 59, 61, 104, 105
See application file for complete search history.

(56) References Cited

U.S. PATENT DOCUMENTS

| | | | |
|---|---|---|---|
| 4,729,605 A | 3/1988 | Imao et al. | |
| 5,110,190 A * | 5/1992 | Johnson | B60B 5/02 301/104 |
| 5,131,727 A * | 7/1992 | Johnson | B60B 7/02 301/37.41 |
| 5,424,021 A * | 6/1995 | Nakade | A42B 3/06 264/257 |
| 6,036,281 A | 3/2000 | Campbell | |
| 7,988,240 B2 | 8/2011 | Lubecki | |
| 8,313,154 B2 | 11/2012 | Lubecki | |
| 8,794,714 B2 | 8/2014 | Lubecki | |
| 2003/0085610 A1 | 5/2003 | Addink et al. | |

(Continued)

FOREIGN PATENT DOCUMENTS

EP 1304238 A1 * 4/2003 ............ B60B 1/003

OTHER PUBLICATIONS

International Search Report and Written Opinion, for PCT Application No. PCT/US2016/030973, dated Aug. 10, 2016, 15 pages.

*Primary Examiner* — S. Joseph Morano
*Assistant Examiner* — Jean W Charleston
(74) *Attorney, Agent, or Firm* — Steven M. Koehler; Westman, Champlin & Koehler, P.A.

(57) ABSTRACT

A spoke for use in connection with a wheel, the spoke having a braided fiber having a first end and a second end, a rod having a first end and a second end, whereby the first end of the rod is threaded and wherein the second end of the rod is disposed inside the first end of the braided fiber.

20 Claims, 8 Drawing Sheets

(56) References Cited

U.S. PATENT DOCUMENTS

| | | | |
|---|---|---|---|
| 2004/0155518 A1* | 8/2004 | Schlanger | B60B 1/0261 |
| | | | 301/58 |
| 2008/0265659 A1* | 10/2008 | Heyse | B29C 70/342 |
| | | | 301/104 |
| 2011/0101768 A1 | 5/2011 | Schlanger | |
| 2013/0033094 A1* | 2/2013 | Lubecki | B60B 1/003 |
| | | | 301/58 |
| 2015/0035347 A1 | 2/2015 | Connolly | |

* cited by examiner

SPOKE COMPOSED OF BRAIDED FIBER WITH HUB AND RIM TERMINATIONS

PRIORITY CLAIM

This application claims priority to U.S. Provisional Patent Application Ser. No. 62/160,124 entitled "Spoke Composed of Braided Fiber with Hub and Rim Terminations" filed May 12, 2015, and U.S. Provisional Patent Application Ser. No. 62/278,527 entitled "Spoke Composed of Braided Fiber with Hub and Rim Terminations" filed Jan. 14, 2016, the contents of which are incorporated herein by reference.

FIELD OF THE INVENTION

The disclosed embodiments relate generally to spokes for vehicle wheels, and more particularly, to wheel connection systems incorporating flexible spokes having braided fibers with hub and rim terminations.

BACKGROUND OF THE INVENTION

Many types of wheels employ metal spokes to form a connection structure between the hub (which forms the center of the wheel and is usually attached to an axel) and the rim (which forms the outer circumference of the wheel and usually has a rubber tire affixed thereto). A spoked wheel is used commonly in bicycles because it allows the wheels to be lighter than if a solid structure was used to connect the hub and rim. Since extra weight increases the inertia of a wheel and therefore slows the ability of the rider to accelerate quickly or climb hills, many attempts have been made in the past to optimize the materials and construction of bicycle wheels.

Bicycle spokes are typically constructed of stainless steel due to its high strength, good fatigue life, excellent corrosion resistance, and low cost. In a common road bicycle, stainless steel spokes typically weigh about 8 grams each and there may be a total of up to 64 spokes split between the two wheels. To reduce weight, the spokes can be manufactured with a smaller diameter in the middle of the spoke, a process called butting. Butted spokes can be in the 4 to 6 gram range, however they cannot be reduced below a certain cross sectional area because the tensile strength and fatigue properties become insufficient to warrant extended use without failure. Even with these reduced weights, bicycle spokes still make up a significant portion of the weight of the wheels. In the past, spoke manufacturers have utilized materials such as titanium, fiber-reinforced plastic, and other polymers to try to decrease the weight further, but none of these options has attained mainstream success.

In past implementations, each of the materials discussed above have had shortcomings when compared to stainless steel: titanium spokes have low stiffness, higher costs, and reduced fatigue life compared to steel. Fiber reinforced plastic (or carbon fiber) can fail catastrophically if one or more spokes fail individually. Novel plastics, such as polybenzoxazole require the use of custom wheel components and are therefore not desirable. In addition, novel plastics introduced in the past have required a protective jacket around the core to protect the plastic from sources of degradation such as UV exposure, abrasion by foreign objects, and moisture. Because of these disadvantages, stainless steel spokes remain the prevailing material used in bikes today.

Polymer technology has greatly advanced however in the past decades to the point where materials with sufficiently favorable properties have been commercialized. These properties include strength to weight ratio, creep resistance, UV resistance, moisture resistance, and cost to manufacture. Because of this, thick protective coatings are no longer required in some cases. Also, creep resistant polymers have been developed increasing the number of materials which could theoretically be used to make bicycle spokes.

The technology necessary for effective utilization of high-performance materials in typical bike wheel configurations has not caught up with the materials themselves. Prior art does not teach a technique which allows for integration with common hubs and rim connections. In fact, prior art describes connections and spoke implementations which preclude integration with standard wheel components. This is a critical omission because the industry is largely standardized. Accordingly, products with custom requirements are unlikely to be adopted and commercially successful.

The idea of specifically utilizing a non-rigid material to replace stainless steel was proposed as early as 1990 in U.S. Pat. No. 5,110,190 by Johnson. In this patent, generic connection methods for fabricating a wheel from non-rigid spokes are disclosed, but the ability to construct the spoke such that it can be incorporated into a standard wheel is not taught. In fact, many of the materials and connections modalities discussed are explicitly not compatible with traditional wheel components and require the use of a specially designed system. For example, creating an enlarged head through affixation of a bulb or knot tying means the enlarged end will, by definition, be too large to insert through the hub holes. The opposite end of the spoke taught by Johnson uses a non-standard rim-spoke connection, incompatible with traditional nipples that those familiar with the bicycle industry use. Other methods presented suffer from this fundamental flaw—incompatibility with standard hubs, rims, and nipples.

Another flexible spoke design was proposed by Campbell in U.S. Pat. No. 6,036,281 which utilized liquid crystal fibers and an extruded jacket. The jacket is necessary to protect the fibers which are susceptible to breakage when loaded transverse to their main axis of orientation. This combination produces a spoke that is over 3 mm in diameter which is too large to fit through a standard hub hole. Additionally, the rim connection taught in the patent is also incompatible with a standard rim hole or nipple because the fiber must go through the center of the threaded section. Non-standard hubs and rims are required to construct a wheel out of these spokes.

Lubecki, in U.S. Pat. Nos. 7,988,240, 8,313,154, and 8,794,714 discloses yet another spoke connection strategy in which a custom hub with cradles cut into the hub flanges is used to interlock a flexible spoke. While this strategy helps to get around earlier assembly problems, it still requires a custom hub to be manufactured and thus does not address the fundamental problem.

Even rigid alternate materials have struggled with compatibility with standard equipment. The fiber-reinforced-plastic spoke proposed by Imao in U.S. Pat. No. 4,729,605 adds several incremental components between the hub connection and the rim connection which add a significant amount of weight to the spoke. Introduction of extra components quickly eliminates the weight advantages of non-steel materials.

In light of the past aforementioned attempts to create an improved wheel connection system for flexible spokes, it is clear that none have been able to incorporate the spokes with standard equipment.

SUMMARY OF THE INVENTION

The above deficiencies and other problems associated with wheels are reduced or eliminated by the disclosed spoke composed of braided fiber with hub and rim terminations. In accordance with one embodiment, a spoke comprises a braided synthetic fiber terminated with a threaded rod on one end and an eye splice on the other end which is compatible with standard "J-bend" and "straight pull" hubs as well as standard rims.

The present embodiment has several advantages over the prior art. First, the present invention has the ability to incorporate flexible materials into standard bicycle hub and rim systems without customization or excessive installation methods. The flexible materials which are available also have the advantages of higher strength-to-weight ratios than steel. They also have the ability to easily transport without damaging since they can be freely bent. In addition, the present invention also has optimal vibration damping, better fatigue life than metal, and improved resistance to impact loading.

In another embodiment, the invention includes a spoke for use in connection with a wheel, the spoke having a braided fiber having a first end and a second end, a rod having a first end and a second end, whereby the first end of the rod is threaded and wherein the second end of the rod is disposed inside the first end of the braided fiber.

In yet another embodiment, the invention includes a spoke for use in connection with a wheel including a braided fiber having a first end and a second end, whereby the second end of the braided fiber is spliced to form an eye splice, a rod having a first end and a second end, whereby the first end of the rod is threaded, wherein the second end of the rod is disposed inside the first end of the braided fiber.

In yet another embodiment, the invention includes a hub for a wheel. The hub includes a flange having at least one aperture, a spoke comprising a braided fiber fabricated from 12-strand, braided, ultra high molecular weight polyethylene braided fiber having a first end and a second end, whereby the second end of the braided fiber is spliced to form an eye splice, a rod having a first end and a second end, whereby the first end of the rod is threaded, wherein the second end of the rod is disposed inside the first end of the braided fiber and wherein the eye splice passes through the at least one aperture in the flange and the rod passes through the eye splice to form a chocker hitch when the spoke is pulled radially from the center rotation of the hub.

In an alternate embodiment, the invention includes a wheel comprising a tire affixed to a rim, a hub having a flange including at least one aperture, a plurality of spokes comprising a braided fiber fabricated from 12-strand, braided, ultra high molecular weight polyethylene having a first end and a second end, whereby the second end of the braided fiber is spliced to form an eye splice. A rod has a first end and a second end, whereby the first end of the rod is threaded. Wherein the second end of the rod is disposed inside the first end of the braided fiber, wherein the eye splice passes through the at least one aperture in the flange and the rod passes through the eye splice to form a chocker hitch when the plurality of spokes are pulled radially from the center rotation of the hub and wherein the first end of the rod is fastened to the rim by means of a nipple.

BRIEF DESCRIPTION OF THE DRAWINGS

The invention may be more completely understood in consideration of the following detailed description of various embodiments of the invention in connection with the accompanying drawings, in which.

Figure 1:
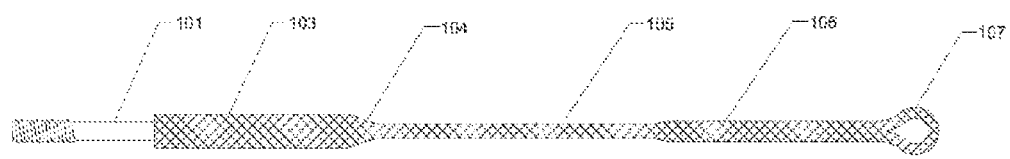
FIG. 1 shows a side view of a flexible spoke with appropriate termination embodiments, in accordance with the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENT

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

FIG. 1 shows one embodiment of the spoke of the present invention. The spoke in FIG. 1 consists of a 12-strand, braided, ultra high molecular weight polyethylene (UHMWPE) fiber braid 105 that is attached to a threaded stainless steel rod 101 on one end and spliced to form an eye splice 107 at the other end. One end of the stainless steel rod 101 is threaded and the other end is rounded, but the rounded end is not visible in this drawing because the rounded end is inside the UHMWPE fibers. The stainless steel rod ends at point 104, which is made obvious in the drawing as the overall diameter of the spoke decreases at this point. The stainless steel rod and the UHMWPE braided fibers are connected by means of ethyl cyanoacrylate glue (e.g., Loctite 401) at the interface between the stainless steel rod and the UHMWPE braided fibers, which is denoted with 103. Additionally, when pulled tight, the braided fibers act like a Chinese finger trap to hold themselves to the stainless steel rod. Thus, the glue does not need to hold all of the force. On the other end of the braided fiber, an eye 107 is formed by feeding the end back through itself. This is possible because the inside of the braided fibers is hollow. The re-inserted braided fiber inside the braided fiber is apparent in the drawing at 106 because of the increased diameter. To prevent the loop 107 from inadvertently disassembling, the glue is inserted in the space between the fibers of the inner and outer braided fibers 106.

The braided fiber 105 does not need to be UHMWPE. It could instead be a different braided fiber with high tensile strength such as aramid, polybenzoxazole, stainless steel, titanium, carbon fiber, polypropylene, low molecular weight polyethylene, cross-linked polyethylene, or the like. The advantage of using a high strength-to-weight material such as UHMWPE is that the spokes are lighter than traditional steel spokes. Also, the braid could be 8-strand, 16-strand, 3-strand, or some other number of strands. Instead of stainless steel, the rod could be made out of regular carbon steel, titanium, a carbon fiber composite, or some other material. The eye splice 107 could also be of different dimensions.

The overall length of the spokes of the present invention could be from 10 cm to over 100 cm, dependent on the diameter of the wheel that is being built. For a standard bicycle wheel, the spokes of the present invention would be approximately 20 to 35 cm in length.

A coating is not necessary to protect the spokes from abrasion to foreign objects or degradation due to sunlight and chemicals. However another embodiment of our spokes includes a coating to protect the fibers, bonding agent, and the threaded rod from degrading, or being otherwise altered from any source. The coating could be polyurethane, polyolefin (i.e., polyethylene, polypropylene, etc.), or silicon-based rubber. The coating could be applied before or after the assembly of the spoke. The coating could be any polymer material, a material including metal fibers, or any other material. A preferred coating penetrates the fibers and provides a protective layer on the outside of all of the fibers. The thickness of the coating could range from a single molecule layer to 2 mm thick. Another option to protect the fibers is a heat-shrinkable tubing placed over the entire length or some part of the length of the spoke post-construction.

Figure 2:
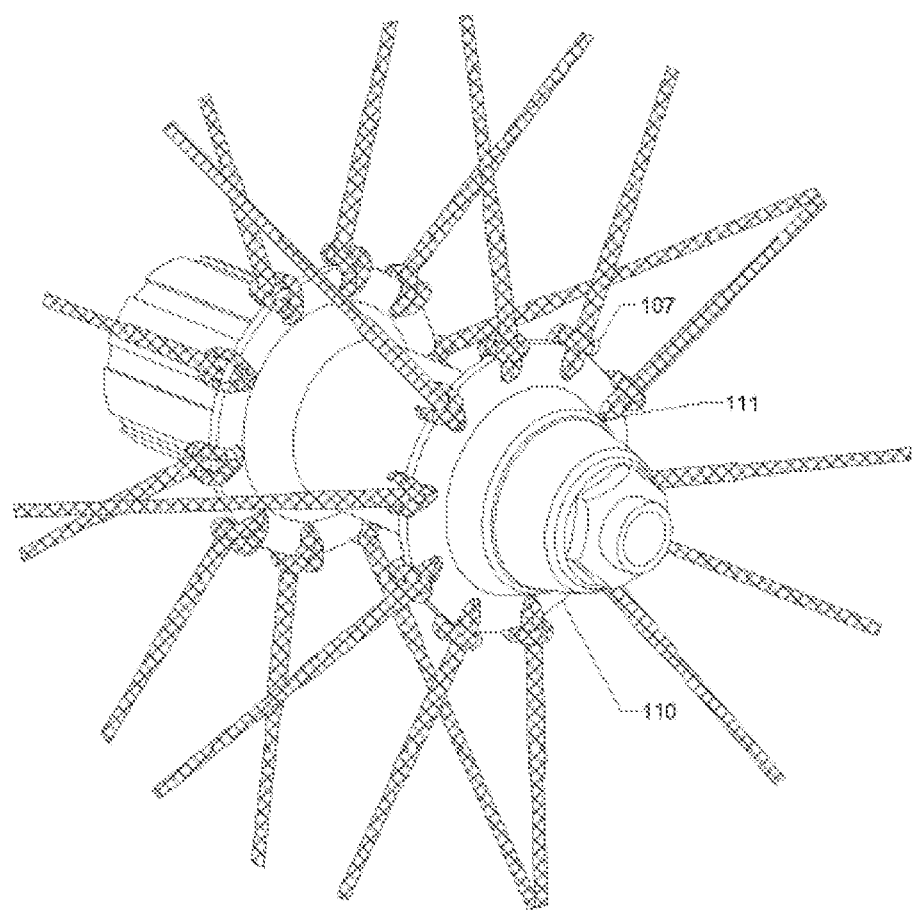
FIG. 2 shows a isometric view of a wheel hub with several spokes connected in a choker knot in accordance with the present invention.

FIG. 2 shows the way in which one version of our spoke attaches to a bicycle hub flange 110. Only the eye splice ends of the spokes are shown in FIG. 2. In this drawing, the spokes are radially laced, which means they extend out radially from the center of rotation of the bicycle hub. The eye splice 107 passes through a hole 111 in the hub flange 110 and the spoke passes through the eye splice to form a choker hitch. This is done by first threading the eye splice 107 through a hole in the hub 111 and then putting the other end of the spoke through the loop in the eye splice and pulling tight. This connection would work well for a wheel that does not have to transmit tangential forces, such as a front bicycle wheel.

The spokes may instead be connected to a different type of hub such as a wheelchair hub, a motorcycle hub, or the hub of any other type of automobile or human powered vehicle. In FIG. 2, there are 22 spokes that are shown connected to the hub. There could be any number of these spokes connected to a hub with any number of spoke holes. In addition, the spokes need not be radially laced with the choker hitch knot. The spokes could instead leave the hub flange 110 at a tangent to the hub flange, or at any other angle.

Figure 3:
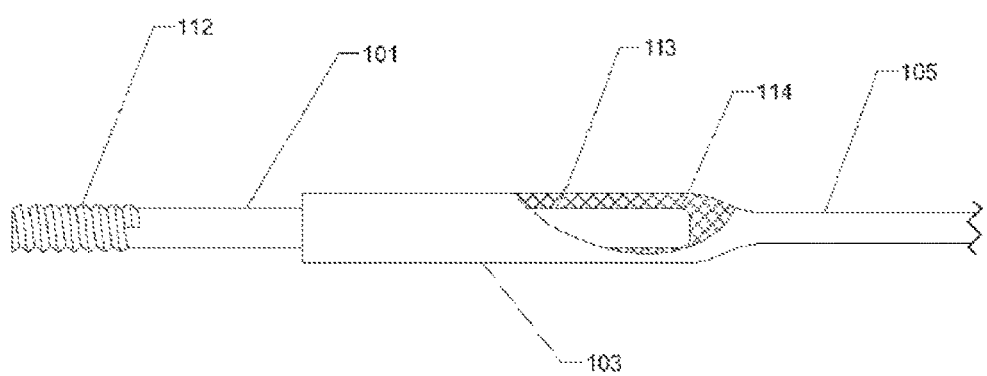
FIG. 3 shows a cross sectional view of the rim side of the spoke revealing the threaded rod connection in accordance with the present invention.

FIG. 3 shows a close up view of one version of the threaded rod end of our spoke. The stainless steel rod 101 is connected to the UHMWPE braided fiber 105 by means of ethyl cyanoacrylate glue 113 at the interface between the stainless steel rod and the UHMWPE braided fiber 105. A different type of high-shear-strength and low viscosity glue could be used instead of ethyl cyanoacrylate. The cut away in the figure shows the rounded end of the stainless steel rod 114. The threads 112 on the stainless steel rod are 56 threads per inch, have an outside diameter of about 2.2 mm, and are such that they can screw into a standard nipple that holds a rim in tension. However, the thread pitch and rod diameter could be different so that it screws into a different size nipple or nut. The length of the threads are 1.0 cm in this version of the spoke, but could be as short as 0.5 cm and as long as 5 cm. The diameter of the UHMWPE braided fiber 105 is 1.4 mm, but it could be as small as 0.5 mm and still be strong enough to be used as part of the spoke of the present invention. The diameter of the UHMWPE braided fiber could also be larger which would make the spoke stronger, but less aerodynamic when the wheel is spinning. The end of the stainless steel rod could be sharpened or tapered to reduce the stress concentration at this point that forms when the braided fiber is pulled taught. Or, the stainless steel rod could be flat on the end.

The maximum diameter of the embodiment of the spoke depicted in FIG. 3 is 2.9 mm, which occurs at location 103. With a smaller diameter stainless steel rod (e.g., 1.5 mm) this maximum diameter could be reduced to 2.4 mm. Or, with an even smaller diameter stainless steel rod, the maximum diameter could be reduced even further. A maximum diameter of less than 2.4 mm would allow the threaded end connection to pass through a standard bicycle hub during spoke installation. Alternatively, the maximum diameter of the spoke could be increased to 5 mm or larger using a rod 101 with a larger diameter or a braided fiber 105 with a larger diameter. Such a spoke could withstand higher loads.

Figure 4A:
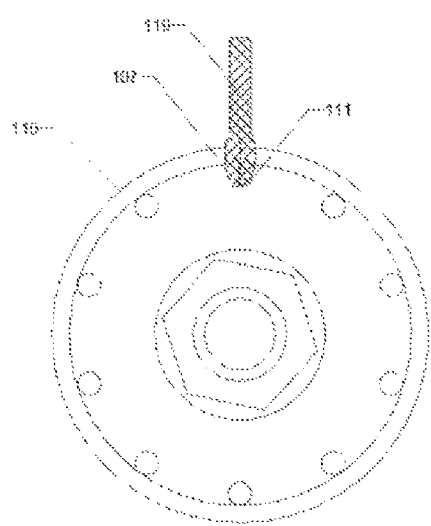
FIG. 4A shows a side view of a wheel hub with a spoke connected by a tether threaded through the eyelet in accordance with the present invention.
Figure 4B:
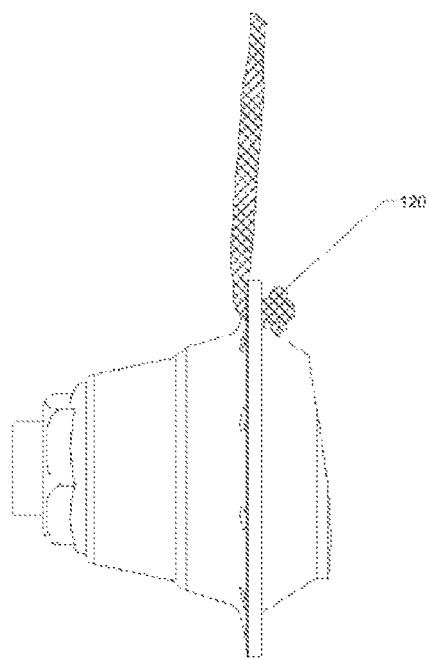
FIG. 4B shows a front view of a wheel hub with a spoke connected by a tether threaded through the eyelet in accordance with the present invention.

FIG. 4A and FIG. 4B show another way in which the spoke 119 of the present invention can connect to a bicycle hub flange 110. The eye splice 107 on the end of the spoke is fed through a hole in the flange 111 and a piece of braided fiber 120 is then fed through the hole in the eye splice. Now, when the spoke is pulled, the eye splice cannot be pulled back through the hole in the hub flange as long as the holes 111 are not too big and there is not much clearance when inserting the eye splice through the hole. The drawing only shows the eye splice end of the spoke, and does not show a complete spoke (which is depicted in FIG. 1). The spoke depicted in FIG. 4A and FIG. 4B extends radially from the hub flange, but it could also extend tangentially from the hub flange, or at some other angle. Furthermore, instead of a braided fiber 120, a piece of solid metal or plastic could be inserted through the eye splice to prevent it from pulling back through the hole in the hub. As depicted in FIG. 4B, the eye splice is inserted from outside of the hub flange towards the inside of the hub flange, but the spoke could also be inserted in the opposite way from the inside out.

Figures 5A, 5B:
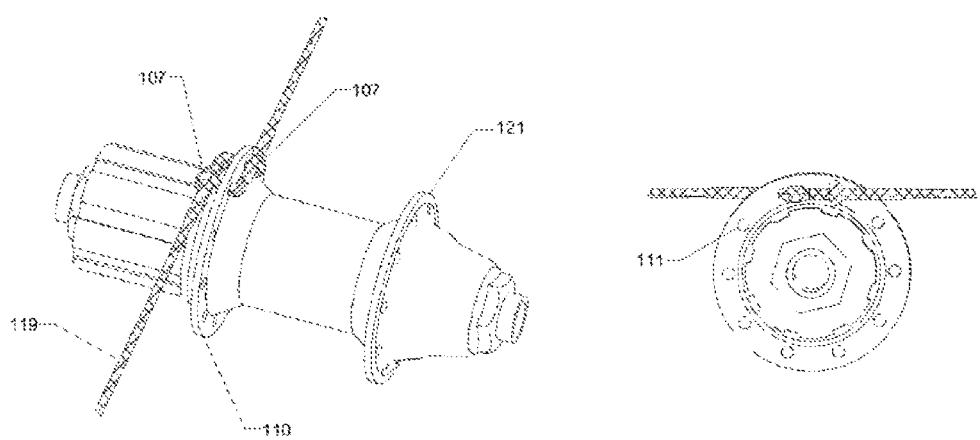
FIG. 5A shows an isometric view of a tangential lacing pattern for a hub comprised of connecting two spoke eyelets together in accordance with the present invention.
FIG. 5B shows a side view of a tangential lacing pattern for a hub comprised of connecting two spoke eyelets together in accordance with the present invention.

FIG. 5A and FIG. 5B show another way in which the spokes 119 of the present invention can be connected to a bicycle hub flange 110. In this design, the eyes 107 of two spokes next to each other are first inserted through the holes 111 in the hub flange 110 from opposite directions. Then, the ends of the spokes are inserted through the eye splices of the nearby spokes to prevent both spokes from pulling back out of the hub. This design would work for a tangentially laced wheel such as a bicycle wheel that is tangentially laced. The angles at which the spokes leave the hub flange could be any angle and need not be perfectly tangent to the imaginary line extending from the center of the hub flange to the spoke hole 111.

Figure 6:
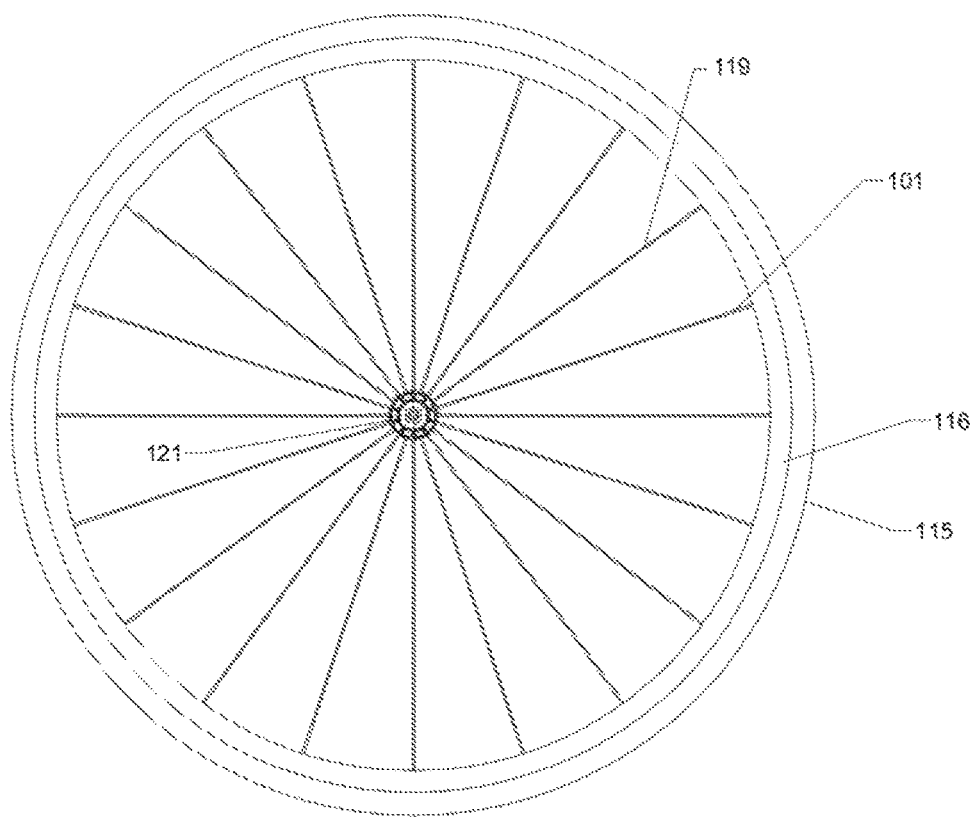
FIG. 6 shows a side view of a full wheel assembled with the spokes in accordance with the present invention.

The spokes can be used to build a bicycle wheel as shown in FIG. 6 by connecting the eye splice 107 of each spoke 119 to a bicycle hub 121 and by screwing the threaded end 101 into a nipple at the bicycle rim 116. The spokes can then be tensioned to create a strong bicycle wheel in a similar fashion to traditional steel bicycle spokes. A tire 115 is generally present on a wheel to provide grip to the road surface.

Figure 7:
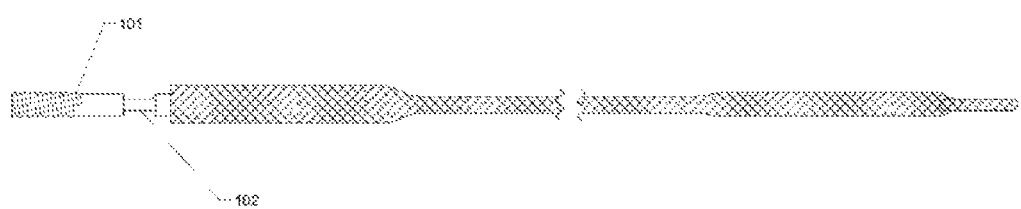
FIG. 7 shows a side view of an embodiment of the spoke with formed wrench-flats to aid in assembly in accordance with the present invention.

Another embodiment of the spoke of the present invention is shown in FIG. 7. The stainless steel rod 101 contains a flat section 102. The flat section 102 could be used to assist in preventing the spoke from twisting when installing into a wheel.

Figure 8:
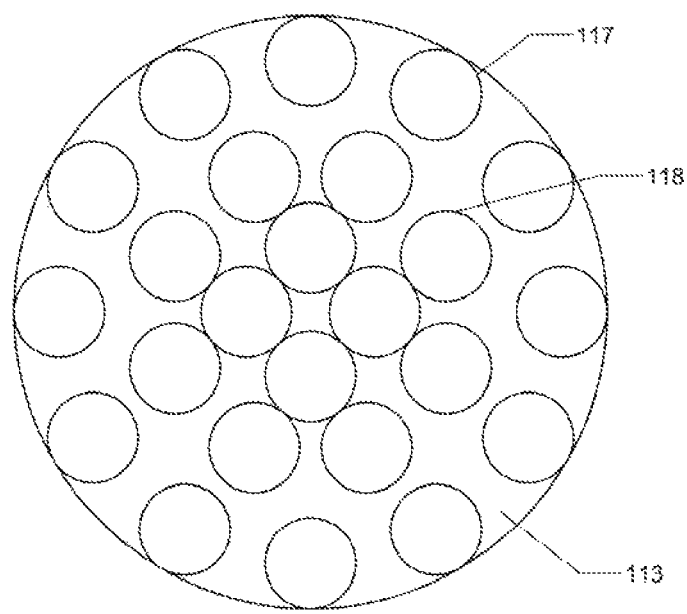
FIG. 8 shows a cross-sectional view of an eye splice of a spoke in accordance with one embodiment of the present invention.

FIG. 8 shows a cross-section of an eye splice of one version of the spoke of the present invention. The cross section depicted in FIG. 8 is that of location 106. The strands of the outer braided fiber 117 encircle the strands of the inner braided fiber 118. Glue 113 fills the voids between the fiber strands. The glue provides a bond between the inner and outer strands of the inner and outer braided fibers such that they will not slide past each other when the spoke is in tension by applying opposing forces to the threaded rod and the eye. A low viscosity glue such as ethyl cyanoacrylate penetrates the fibers of both the inner and outer braided fibers and provides a physical interlock between the braided fibers. A phenomenon (sometimes known as the Chinese finger trap effect) occurs when tension is applied to the spoke causing reduction of the diameter of the outer braided fiber 117 and increase holding force on the inner braided fiber 118. The Chinese finger trap action that occurs provides friction such that the glue is not necessary. However, the glue allows for a shorter section of buried braided fiber in location 106 for a given strength than would be possible without the glue. Furthermore, the glue prevents the inner braided fiber from pulling out of the outer braided fiber when the braided fiber is not under tension and the Chinese finger trap force is not in action.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The invention claimed is:

1. A spoke for use in connection with a wheel, the spoke comprising:
   a braided fiber having a first end and a second end; and
   a rod having a first end and a second end, whereby the first end of the rod is threaded,
   wherein the second end of the rod is disposed inside the first end of the braided fiber, and wherein the braided fiber is configured to frictionally engage with the rod when tension is applied thereby reducing a diameter of the braided fiber surrounding the rod and increasing a holding force on the rod to inhibit the braided fiber from detaching from the rod.

2. The spoke of claim 1, wherein the second end of the rod is fastened to an inside of the first end of the braided fiber with adhesive.

3. The spoke of claim 2, wherein the adhesive consists of ethyl cyanoacrylate glue.

4. The spoke of claim 1, wherein the braided fiber is comprised of ultra high molecular weight polyethylene braided fiber.

5. The spoke of claim 1, wherein the second end of the rod is fastened to the inside of the first end of the braided fiber by a frictional force created when the first end of the rod is pulled in a direction opposite the second end of the braided fiber.

6. The spoke of claim 5, wherein the second end of the rod is further fastened to the inside of the first end of the braided fiber by an adhesive.

7. The spoke of claim 1, wherein an eye splice is formed on the second end of the braided fiber by feeding the braided fiber back through itself.

8. The spoke of claim 7, wherein inner and outer fibers of the eye splice are further fastened to each other by means of an adhesive.

9. The spoke of claim 1, wherein the braided fiber is selected from the group consisting of aramid, polybenzoxazole, stainless steel, titanium, carbon fiber, carbon nanotubes, polypropylene, ultra high molecular weight polyethylene, low molecular weight polyethylene, and cross-linked polyethylene, or mixtures thereof.

10. The spoke of claim 9, wherein the braided fiber is a hollow braid comprising 8 to 24 strands.

11. The spoke of claim 9, wherein the braided fiber is a hollow 16-strand braid.

12. The spoke of claim 9, wherein the braided fiber is a hollow 12-strand braid.

13. The spoke of claim 1, wherein the rod is fabricated of metallic materials, non-metallic materials, or mixtures thereof.

14. The spoke of claim 1, wherein the rod is fabricated of stainless steel.

15. The spoke of claim 1, wherein the spoke is covered with a coating selected from the group consisting of polyurethane, polyolefin, and silicone-based rubber.

16. The spoke of claim 15, wherein the coating is less than 0.5 mm thick.

17. The spoke of claim 1, wherein the diameter of the braided fiber is less than 2 mm.

18. The spoke of claim 1, further comprising a heat-shrinkable tubing disposed over a portion of the spoke.

19. A wheel comprising:
a tire affixed to a rim;
a hub comprising:
a flange including at least one aperture;
a plurality of spokes comprising a braided fiber having a first end and a second end;
a rod having a first end and a second end, whereby the first end of the rod is threaded, wherein the second end of the rod is disposed inside the first end of the braided fiber, and wherein the braided fiber is configured to frictionally engage with the rod when tension is applied thereby reducing a diameter of the braided fiber surrounding the rod and increasing a holding force on the rod to inhibit the braided fiber from detaching from the rod, and
wherein the first end of the rod is fastened to the rim by means of a nipple.

20. The spoke of claim 1, wherein the first end of the braided fiber is hollow and the diameter of the first end of the braided fiber is configured to receive the second end of the rod prior to tension being applied to the braided fiber.

* * * * *